(12) United States Patent
Lang

(10) Patent No.: US 6,647,863 B2
(45) Date of Patent: Nov. 18, 2003

(54) DEVICE FOR MAKING MOCHA COFFEE

(76) Inventor: Christoph Lang, Klinge 10, D-73087 Bad Boll (DE)

( * ) Notice: Subject to any disclaimer, the term of this patent is extended or adjusted under 35 U.S.C. 154(b) by 0 days.

(21) Appl. No.: 09/880,355

(22) Filed: Jun. 13, 2001

(65) Prior Publication Data

US 2001/0052293 A1 Dec. 20, 2001

(51) Int. Cl.[7] .............. A47J 31/06; A47J 31/40
(52) U.S. Cl. .............. 99/287; 99/348; 366/286
(58) Field of Search .............. 99/287, 323.3, 99/348; 366/146, 286, 289

(56) References Cited

U.S. PATENT DOCUMENTS

| | | | |
|---|---|---|---|
| 4,357,861 A | * 11/1982 | Di Girolamo | 99/323.3 |
| 4,576,089 A | * 3/1986 | Chauvin | 99/348 X |
| 4,936,688 A | * 6/1990 | Cornell | 366/146 |
| 4,993,593 A | * 2/1991 | Fabiano et al. | 99/348 X |
| 5,363,746 A | * 11/1994 | Gordon | 99/348 X |
| 5,852,965 A | * 12/1998 | Kim | 99/348 X |
| 6,324,964 B1 | * 12/2001 | Niederberger et al. | 99/287 |

* cited by examiner

Primary Examiner—Reginald L. Alexander
(74) Attorney, Agent, or Firm—Horst M. Kasper

(57) ABSTRACT

A device for preparing of mocha coffee is disclosed. The device comprises a cooking vessel, an electrical heating body electrically insulated supported relative to the cooking vessel, however, thermally coupled to the cooking vessel, and a temperature sensor. A motor driven stirrer rod (3) protrudes into the cooking vessel (2). A blade (4) of the stirrer rod (3) is effective for the stirring of the mocha coffee and is disposed immediately above the heating body (5).

20 Claims, 7 Drawing Sheets

DEVICE FOR MAKING MOCHA COFFEE

BACKGROUND OF THE INVENTION

(1) Field of the Invention

Figure 1:
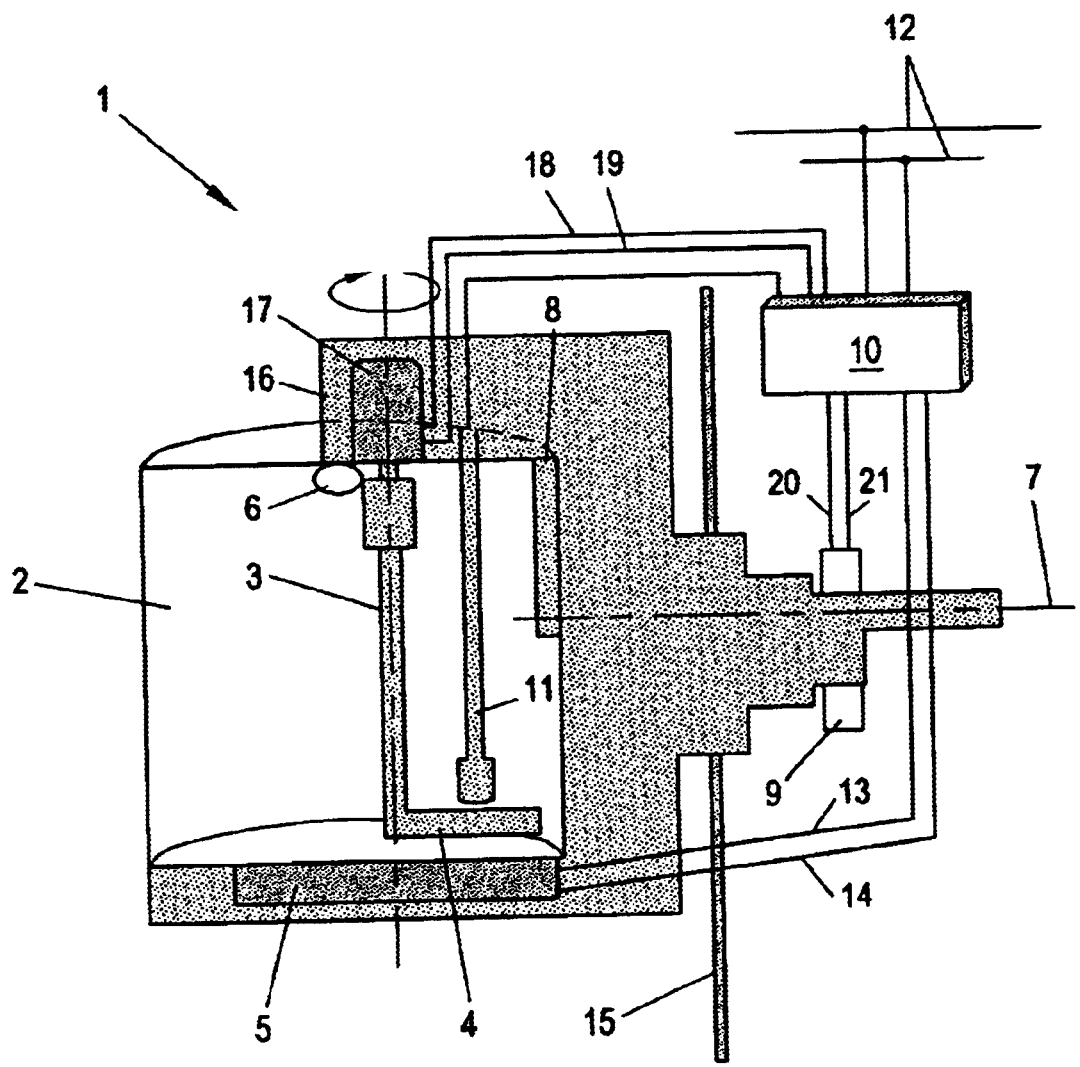

The invention relates to a device for the preparation of mocha coffee with a cooking utensil and electrical heating body disposed electrically insulated relative to the cooking utensil, however, thermally coupled or, respectively, capable of coupling to the cooking utensil, and the temperature sensor.

(2) Description of Related Art including information disclosed under 37 CFR 1.97 and 1.98.

Mocha coffee is prepared in a cooking container by cooking with water, wherein mocha coffee flour is added to the water. An electrically operated mocha coffee machine is known from the flyer Elektronik Sanayi S.A. for the preparation of Turkish mocha coffee, wherein the electrically operated mocha coffee machine prepares Turkish mocha coffee out of water, mocha coffee flour and sugar. The known mocha coffee machine is associated with the disadvantage that the cooking container for the Turkish mocha coffee is subject to line voltage, and whereby the operation of the known mocha coffee machine is associated with a substantial danger for life and limb because of a possible current blow stroke.

BRIEF SUMMARY OF THE INVENTION

It is in object of the present invention to further develop a device of the initially recited kind such that the device enables operationally safe and substantially automatic the preparation of a Turkish, foaming mocha coffee.

The present invention exhibits relative to what is known the advantages that an operationally safe device for the preparation of Turkish mocha coffee is available under compact construction, wherein the operationally safe device does not require any attention until the finishing of the mocha coffee, because the operationally safe device prepares the mocha coffee substantially automatically.

Further advantageous embodiments of the invention result from the sub claims and the following description.

BRIEF DESCRIPTION OF THE SEVERAL VIEWS OF THE DRAWING(S)

Figure 2:
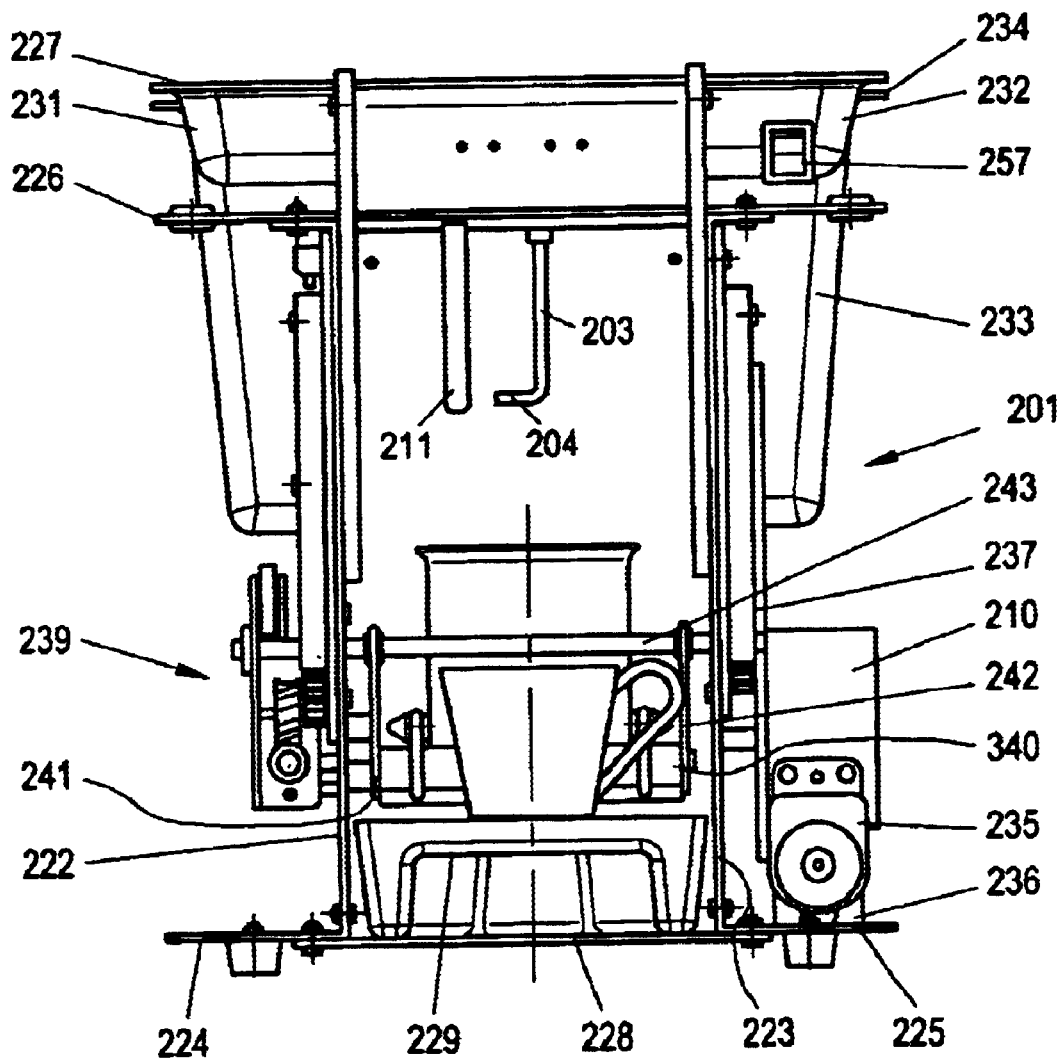
Figure 3:
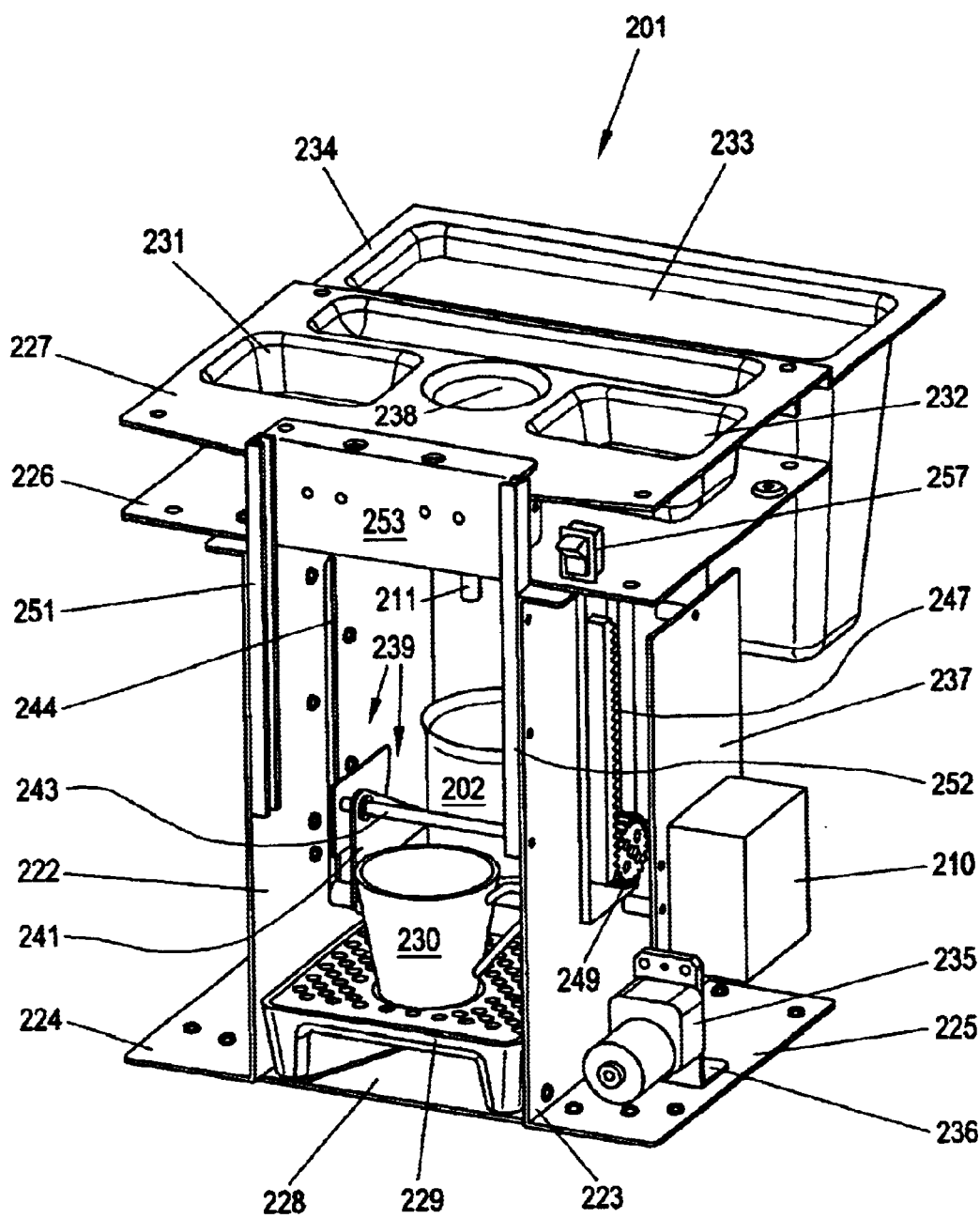
Figure 4:
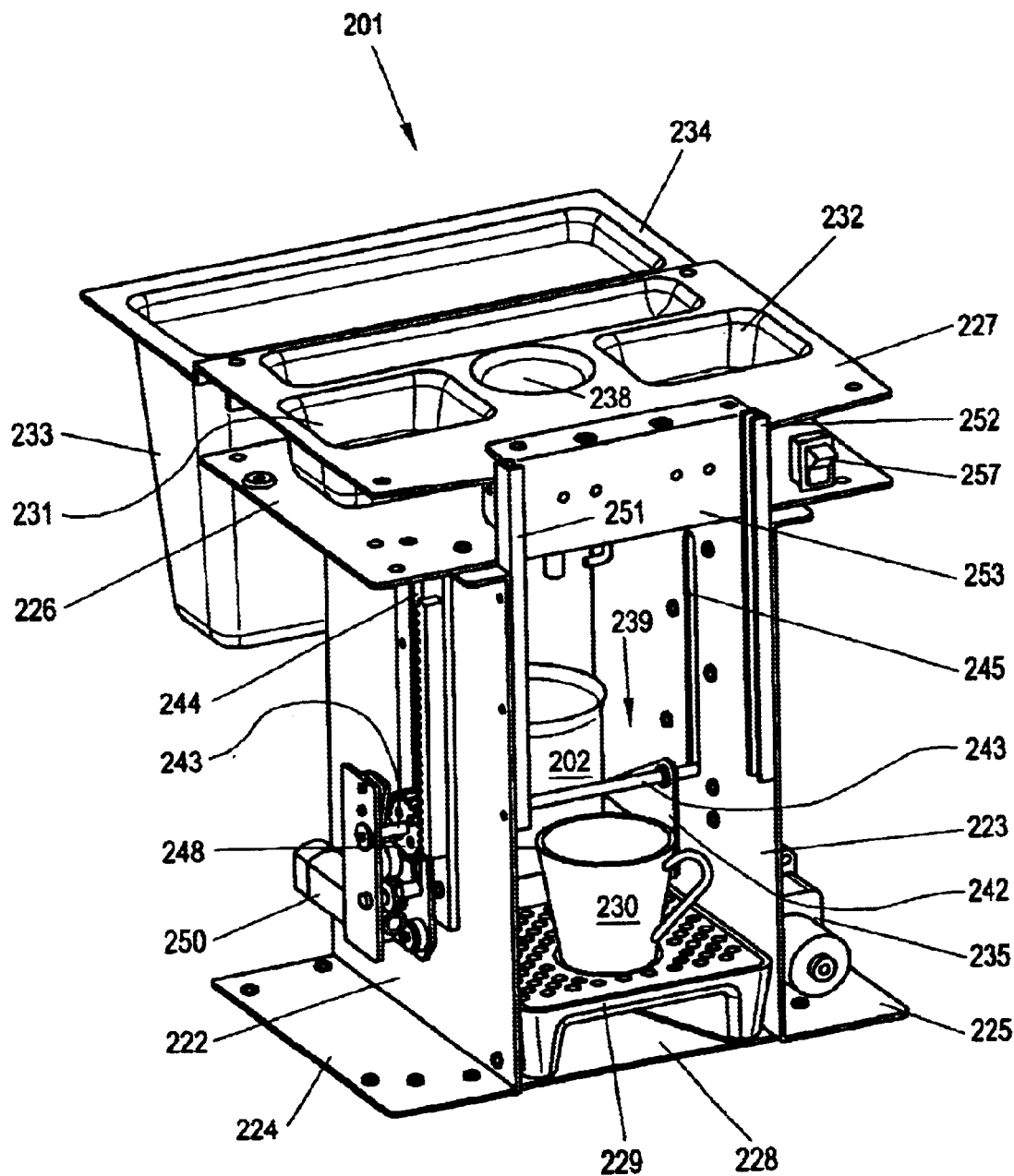
Figure 5:
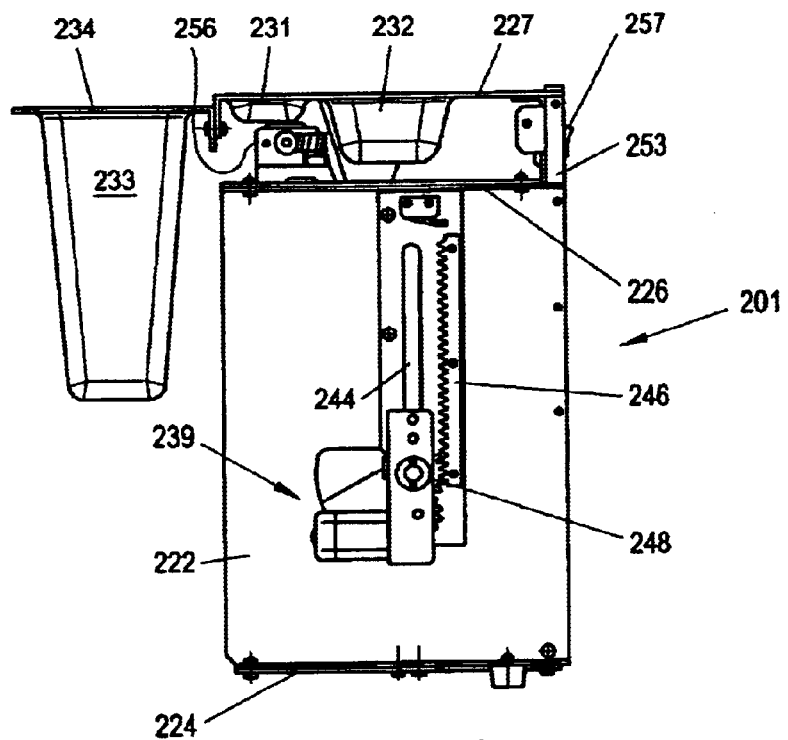
Figure 6:
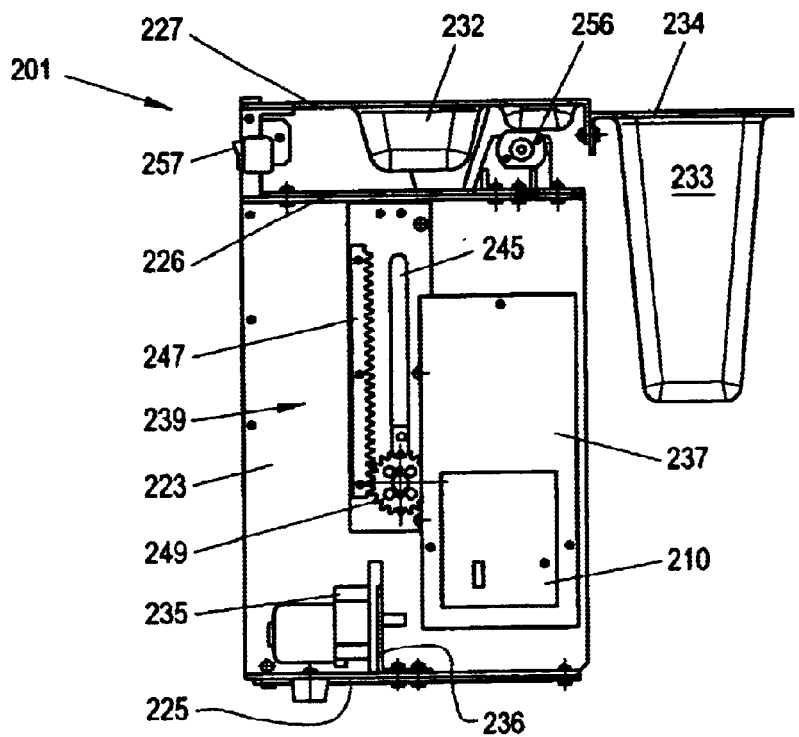
Figure 7:
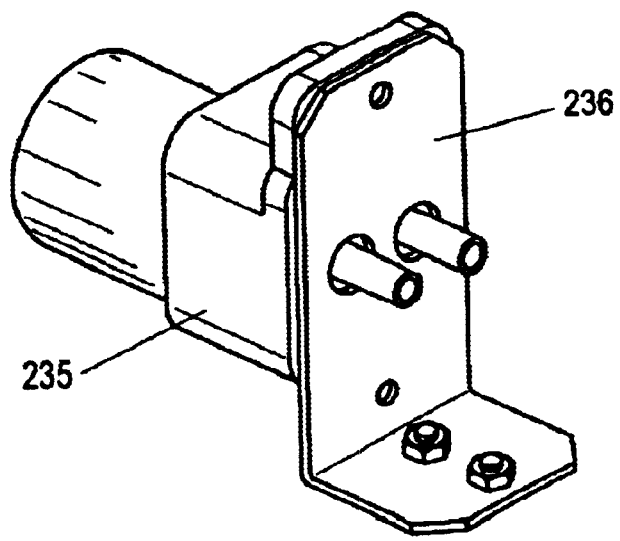
Figure 8:
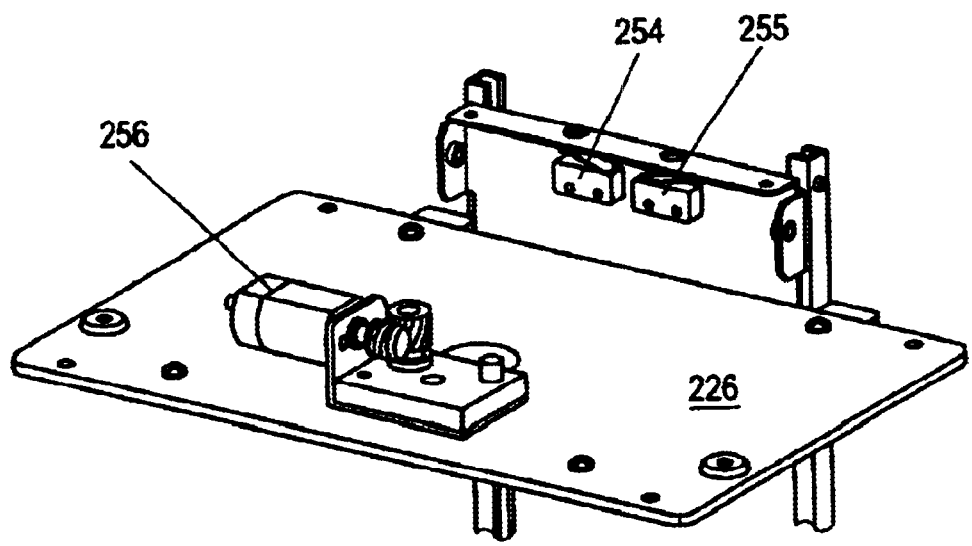
Figure 9:
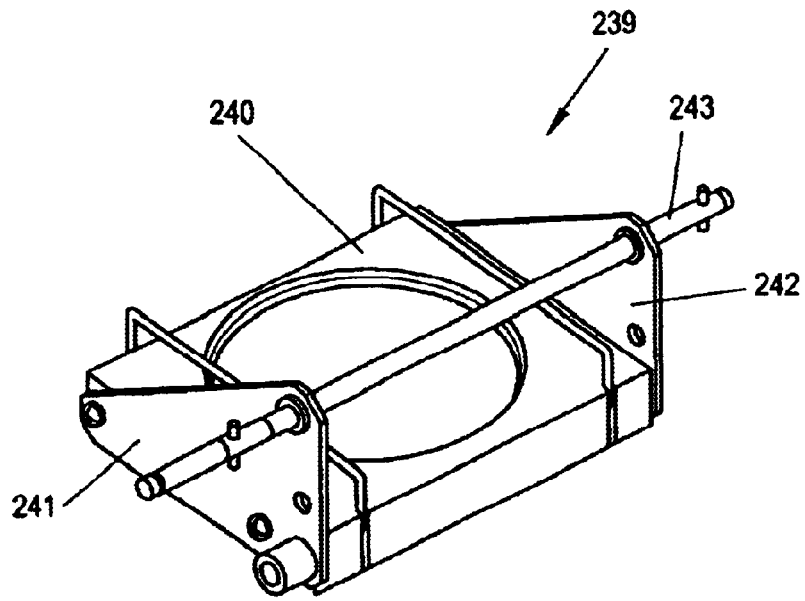
Figure 10:
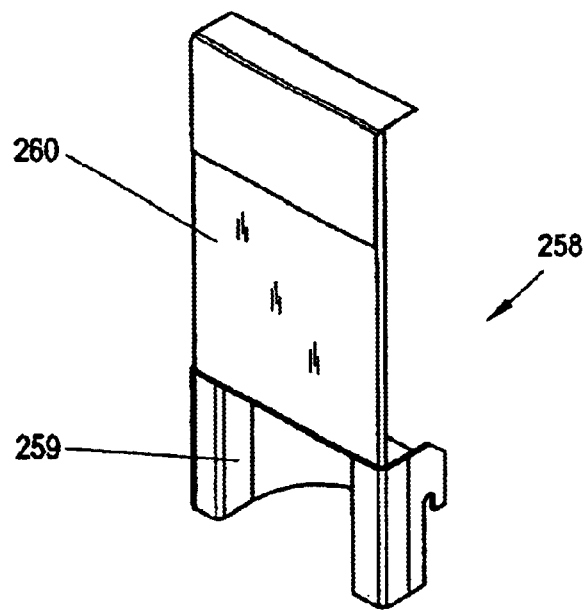

The invention is illustrated by way of embodiments based on drawings. There is shown:

FIG. 1 a sectional view through a first embodiment of the invention,

FIG. 2 a front elevation view of a second embodiment of the invention, wherein side covering pieces and upper covering pieces have been removed, FIG. 3 a perspective view from the right top of the embodiment of the invention according to FIG. 2, FIG. 4 a perspective view from the last top of the embodiment of the invention according to FIG. 2, FIG. 5 a side elevation view from the left of the embodiment of the invention according to FIG. 2, FIG. 6 a side elevation view from the right hand side of the embodiment of the invention according to FIG. 2, FIG. 7 a perspective view of a water pump, FIG. 8 a perspective partial view of a lower cover plate with terminal switches and a servomotor, FIG. 9 a perspective view of a swivel device for the water tank, FIG. 10 a perspective view of a cup blockage.

DETAILED DESCRIPTION OF THE INVENTION

A first embodiment (FIG. 1) of the invention relates to a device 1, wherein the device 1 comprises essentially a cooking container 2 for boiling water or, respectively, mocha coffee with an electrical heating body 5 disposed electrically insulated relative to the cooking container 2, however, thermally coupled to the cooking container 2 and a temperature sensor 11 protruding into the cooking container. Also a stirrer rod 3 with an agitating blade 4 protrudes into the cooking container 2, wherein the agitating blade 4 rotates immediately above the heating body 5 in the cooking container 2, in case the stirrer rod is switched on. The production of foam is favored by the disposition of the agitating blade 4 very close above the heating body 5. A drive motor 17 serves as a driver of the stirring rod 3.

Furthermore a feed tube 8 ends on the top of the cooking container 2 for the water, wherein the Turkish mocha coffee is generated from the water together with the mocha coffee flour and the sugar, which are also entered into the cooking container 2, under application of heat.

The filling tube 8 for the water ending at the cooking container 2 is solidly connected to the cooking container 2 according to the embodiment of the present invention.

A control unit 10 receiving electrical current from the electrical power grid 12 leads electrical current to the electrical heating body 5 through lines 13, 14 for such a time until the Turkish mocha coffee is ready. The control unit 10 switches on and off the drive motor 17 for the stirrer rod 3, which occurs through electrical conduit lines 18, 19.

The cooking container 2 with a cover 16 and the feed tube 8 for the water is swivelably supported at the casing 15 of the device 1. A swivel drive 9 receiving current from the control unit 10 through conduit lines 20,21 and controlled by the control unit 10, serves for swivel in the cooking container 2 such that the finished prepared mocha coffee can be poured through a pour spout 6 of the cooking container 2 out of the cooking container 2 into another vessel, for example a cup.

The pouring spout 6 forms an essentially rectangular angle with the swivel axis 7 of the cooking container 2.

According to another embodiment (not illustrated in the drawings) of the present invention, the cooking container 2 and the heating body 5 are formed as separate parts.

According to a similar, further embodiment (not illustrated in the drawings) of the present invention the cooking container 2 is insertable and again removable into the covering 16 exhibiting the heating body 5.

According to a similar, other embodiment (not illustrated in the drawings) of the present invention the cooking container 2—after removal of the heating body 5—is downwardly movable in the device 1 and is swivelably supported for pouring.

According to a similar, further embodiment (not illustrated in the drawings) of the invention of the cooking container 2—after removal of the heating body 5—is supported removably in downward direction from the device 1. This alleviates the cleaning of the cooking container 2.

According to a different constructed embodiment (FIGS. 2,3,4) of the invention, wherein side and top covering parts have been removed for clarity of the illustration, a device 201 comprises a frame shaped stand formed of a left side parts 222 and out of a right side parts 223, wherein the side parts in each case transition into outwardly away directed foot parts 224, 225, wherein the side parts are maintained at a distance on the top by way of a lower cover sheet metal piece 226 and by an upper cover sheet metal piece 227 and wherein the side parts are connected to each other in this way. The two side parts 222,223 are connected to each other at the bottom under a distance by a floor plate 228. Space for a positioned perforated plate 229 is present between the two side parts 222,223 and in fact between their foot parts 224,225, wherein the position perforated plate 229 serves for receiving a drinking vessel 230, for example a cup or a beaker.

A cooking container 202 for preparing of a mocha coffee is disposed behind the positioned perforated plate 229 for receiving of a drinking vessel 230. The cooking container 22 stands on or lifting device 239, wherein the construction and the functioning of the lifting device 239 are to be explained further down. The lifting device 239 comprises also a heating body 340 (FIG. 2) for the preparation of the mocha coffee.

A support plate 237 is attached at a distance at the right side part 223 (FIGS. 2,3,6), wherein a control unit 210 is seated on the support plate 237. The control unit 210 controls like a program the process courses in the device 201 during the preparation of mocha coffee.

An angle sheet metal piece 236 (FIGS. 2,3,6) is seated on the foot part 225 of the right side part 223 of the device 201, wherein the angle sheet metal piece 236 carries a water pump 235 (FIG. 7). Water hoses (not illustrated in the drawings) are connected to the water pump 235, wherein program controlled water from the water tank 233 is transported into the cooking container 202. The water pump 235 is switched on and off by the control unit 210.

The upper cover sheet metal piece 227 comprises a receiver 231 for coffee flour or, respectively, mocha flour as well as a further receiver 232 for sugar. Furthermore the upper cover sheet metal piece 227 exhibits an upper opening 228 (FIGS. 3,4), wherein a corresponding opening (not illustrated in the drawings) is furnished under the upper opening 238 in the lower cover sheet metal piece 226, wherein the opening is aligned with the upper opening 238.

Rotatingly supported stirring rod 203 (FIG. 2) directs away downwardly from the lower cover sheet metal piece 226, wherein an agitating plate 204 is furnished at the lower end of the stirrer rod 203. Furthermore the temperature sensor 211 (FIGS. 2,3) is directed away downwardly from the lower cover sheet metal piece 226.

A drive motor 256 for the drive of the stirring rod 203 is seated on the lower covering sheet metal piece 226, wherein the stirring rod 203 is switched on and off depending on a program by a control unit 210.

A support plate 234 is applied at the upper cover sheet metal piece 227 and forms with the upper cover sheet metal piece 227 a single piece part, wherein the support plate 234 supports a water tank 233.

A first bar or spar 251 is applied on the top front at a side part 222, a second bar or spar 252 is attached at the top front at the other side part 223. A support plate 253 is mounted at the two bars or spars 251, 252, wherein the support plate 253 in turn carries the terminal switch 254, 255.

The lifting device 239 (FIGS. 2,3,4,5,6,9) comprises a base plate 240, wherein in each case a support part 241, 242 (FIG. 9) out of flat material is attached at two sides at the base plate 240. An axis 243 runs in each case through the support parts 241, 242 through the upper end of each support part 241, 242. The axis 243 is solidly connected to the two support parts 241, 242.

A slot 244 preferably aligned vertically and a first gear rack 246 disposed parallel to the slot 244 are disposed at the side part 222. A preferably vertically aligned slot 245 is furnished at the other side part 223, wherein a second gear rack 247 is applied at the other side part 223 aligned parallel to the slot 245.

A first gear wheel 248 is furnished at a free end of the axis 243 and running on the axis 243 outside of the one side part 222, wherein the first gear wheel 248 is drivable by an electric motor 250. A second gear wheel 249 is present at the other free end of the axis 243 and running on the axis 243 outside of the other side part 223. The first gear wheel 248 is engaged with the first gear rack 246, the second gear wheel 249 is engaged with the second gear rack 247.

A drive motor 256 (FIGS. 5,6,8) is disposed on the lower cover sheet metal piece 226 for driving of the stirrer rod 203 with its stirring blade 204.

A power grid switch 257 (FIGS. 2,3,4,5,6) serves for switching on and off of the device 201, in particular of the control unit 210.

The electrical conduits as well as the water hoses are not shown in the drawings for purposes of clarity of the presentation in the drawings.

MODE OF OPERATION

If mocha coffee is to be prepared with the differently constructed embodiment of the present invention described by way of the FIGS. 2 through 9, that is the device 201, then the power grid switch 257 (FIGS. 2,3,4) is switched on, whereby the control unit 210 (FIGS. 2,3,6) receives current (from a power grid not illustrated in the drawings).

The control unit 210 initiates the lifting device 239 by placing the electric motor 250 under electrical current. The gear wheel 248 (FIG. 4) is placed thereby immediately or through a further gear wheel drive in a suitable rotation direction in rotation, wherein the gear wheel 248 moves upwardly at the gear rack 246. The gear wheel 248 carries along the axis 243, wherein the axis 243 is guided in the two slots 244, 245. Also the gear wheel 249 disposed at the other side of the device 201 (FIGS. 3,6), which gear wheel 249 is disposed engaged with the gear rack 247, serves for guiding. The axis or axle 243 carries the base plate 240 along, whereby the cooking container 22 also is transported together upwardly, and in fact to such extent until the temperature sensor 211 and the stirrer rod 203 with its stirrer blade 204 immerse far into the cooking vessel 202.

Now water is filled from the water tank 233 into the cooking vessel 202, mocha coffee flower and sugar are transferred by hand from the receivers 231, 232 through the opening 238 into the cooking vessel. The control unit switches the heating body on, the mocha coffee is prepared, wherein the temperature of the mocha coffee is measured through the temperature sensor 211 and is delivered to the control unit 210 and the mocha coffee is stirred with the aid of the stirrer rod 203.

The heating body is switched off by the control unit 210 and the stirrer rod 203 is set to rest after a predetermined time duration. The control unit switches the electric motor 250 on with inverted direction of rotation, whereby the lifting device 239 moves downward together with the cooking vessel 202. The axle 243 rests at the ends of the slots 244, 245 after received at the bottom, whereby a worm gear engaging with the gear wheel 248 and being further driven by the electric motor 250 rises upward at the gear wheel 248. The base plate 240 is thereby flipped, according to the embodiment of the present invention by 95 degrees, and in fact such that the finished mocha coffee can flow into the drinking vessel 230. The base plate 240 returns into its starting position control by a program after emptying of the cooking vessel 202, and a new sequence of operation for the preparation of a mocha coffee can be started from the starting position of the base plate 240.

According to another embodiment (not illustrated in the drawings) of the present invention, the cooking vessel is disposed at the bottom above the heating body in the device, wherein agents disposed on the lifting device, that is a stirrer rod with a stirrer blade, a drive motor for the stirrer rod as well as a temperature sensor in each case are lowered downwardly into the cooking vessel for the purpose of preparation of the mocha coffee and are again moved backwardly upwards after preparation of the mocha coffee.

The bars or spars 251, 252 (FIGS. 3,4) are preferably formed as U-rails, which serve to support a cup blockage 258 (FIG. 10). The latter cup blockage 258 has a lower arc shaped guide part 259 for positioning of a drinking vessel 230 on the perforated plate 229 (FIGS. 3,4) and in addition a transparent plate 260, wherein the pouring of the mocha coffee into the drinking vessel 230 can be observed through the transparent plate 260.

What is claimed is:

1. A device for preparing of mocha coffee comprising
   a cooking vessel,
   an electrical heating body disposed below the coking vessel (2) and electrically insulated supported relative to the cooking vessel, wherein the electrical heating body is thermally coupled to the cooking vessel,
   a temperature sensor disposed in the cooking vessel (2),
   a motor,
   a stirrer rod (3) connected to the motor and driven by the motor and protruding into the cooking vessel (2),
   a casing (15), wherein the cooking vessel (2) is supported swivelable around swivel axis (7) in the casing (15),
   a blade (4) disposed at the stirrer rod disposed immediately above the heating body (5) and effective for a stirring of the mocha.

2. The device according to claim 1, further comprising
   an electrical swivel drive (9) furnished for a swiveling of the cooking vessel (2).

3. The device according to claim 1 further comprising
   a filling tube (8) ending in the cooking vessel (2) and solidly connected to the cooking vessel (2) for entering water into the cooking vessel (2).

4. The device according to claim 1 further comprising
   a covering (16) surrounding the heating body (5), wherein the cooking vessel (2) is removable insertable into the covering (16).

5. The device according to claim 1, further comprising
   supporting means for the cooking vessel (2), wherein the cooking vessel (2) is supported movable downwardly by the supporting means after a removal of the heating body (5).

6. The device according to claim 1 further comprising
   second supporting means supporting the cooking vessel (2) downwardly removable after a removal of the heating body (5).

7. A device for preparing of mocha coffee comprising
   a cooking vessel,
   an electrical heating body disposed below the coking vessel (2) and electrically insulated supported relative to the cooking vessel, wherein the electrical heating body is thermally coupled to the cooking vessel,
   a temperature sensor disposed in the cooking vessel (2),
   a motor,
   a stirrer rod (3) connected to the motor and driven by the motor and protruding into the cooking vessel (2),
   a blade (4) disposed at the stirrer rod disposed immediately above the heating body (5) and effective for a stirring of the mocha,
   a pouring spout (6) disposed at the cooking vessel (2),
   a swivel axis (7) of the cooking vessel (2), wherein the pouring spout (6) forms an essentially rectangular angle with the swivel axis (7) of the cooking vessel (2).

8. A device for preparing of mocha coffee comprising
   a cooking vessel,
   an electrical heating body disposed electrically insulated relative to the cooking vessel and thermally coupled to the cooking vessel,
   a temperature sensor disposed in the cooking vessel (202),
   a lifting device (239) furnished with a heating body, wherein the lifting device (239) serves for lifting the cooking vessel (202) for the purpose of mocha coffee preparation and for lowering for emptying of the cooking vessel (202).

9. The device according to claim 8 further comprising
   a water tank (233),
   a water pump (235) connected to the water tank for pumping water out of the water tank (233) and connected to the cooking vessel (202) for delivering water to the cooking vessel (202), wherein the water tank (233) and the water pump (235) serve for a program dependent feeding of water to the cooking vessel (202).

10. The device according to claim 8 further comprising
    a control unit (210) connected to the lifting device (239) and to the water pump (235) and for controlling the lifting device (239), the water pump (235) and the process of the preparation of the mocha coffee.

11. The device according to claim 8 further comprising
    receivers (231,232) disposed in an upper region of the device (201) for a storing of mocha coffee flour and sugar.

12. The device according to claim 8 wherein the lifting device comprises
    a program controlled electric motor (250) as well as at least two gear wheels (248,249) and in each case the gear rack (246,247) fixedly attached to side parts (222, 223), wherein the electric motor (250) and the gear wheels (248,249) are supported at the base plate (240).

13. The device according to claim 8 further comprising
    two gear wheels (248,249) running on an axle (243) belonging to the lifting device (239), wherein the two gear wheels (248,249) are guided in slots (244,245) in the side parts (222,223) of the device (201).

14. The device according to claim 13 further comprising
    an axle (243) serving for supporting the cooking vessel (202) during the pouring out of the finished mocha coffee into a drinking vessel (230).

15. The device according to claim 8 wherein the cooking vessel (2; 202) and the heating body are separate parts.

16. The device according to claim 8 further comprising
    a control unit (10; 210) furnished for switching on and for switching off of the device (1; 201), of the heating body and of the swivel drive (9) or respectively, of the lifting device.

17. The device according to claim 8 further comprising
    a cup blockage (258) furnished for positioning of a drinking vessel (230) on a perforated plate (229).

18. The device according to claim 17 wherein the cup blockage (258) exhibits an arc shaped guide part (259) for the drinking vessel (230) and above a transparent plate (260).

19. A device for preparing mocha coffee comprising a cooking vessel, an electrical heating body disposed electrically insulated relatively to the cooking vessel and thermally coupled to the cooking vessel, a temperature sensor disposed in the cooking vessel, wherein the cooking vessel stands in the device at the bottom above the heating body, and means supported by a lifting device, that is a stirrer rod with a stirrer blade, a drive motor for the stirrer rod, as well as the temperature sensor are supported lowerable downwardly into the cooking vessel and supported again upwardly movable in return.

20. The device according to claim 19 further comprising a blade (4) disposed at the stirrer rod disposed immediately above the heating body (5) and effective for a stirring of the mocha.

\* \* \* \* \*